Dec. 27, 1927.

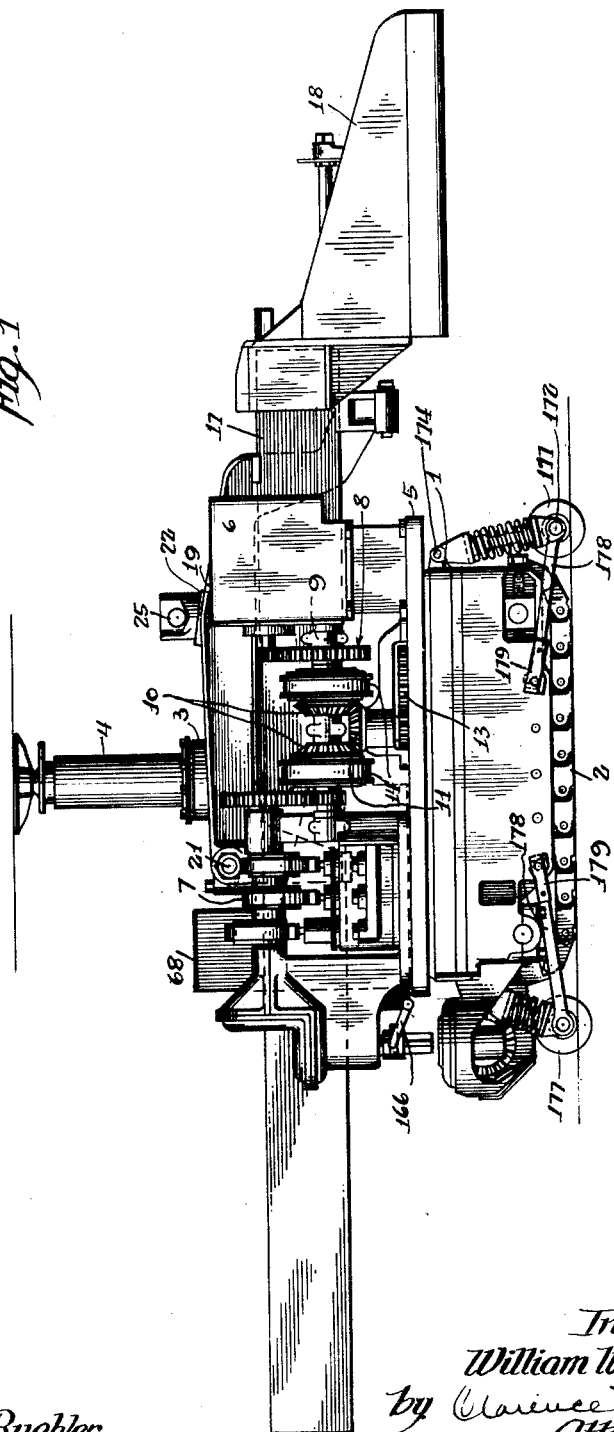

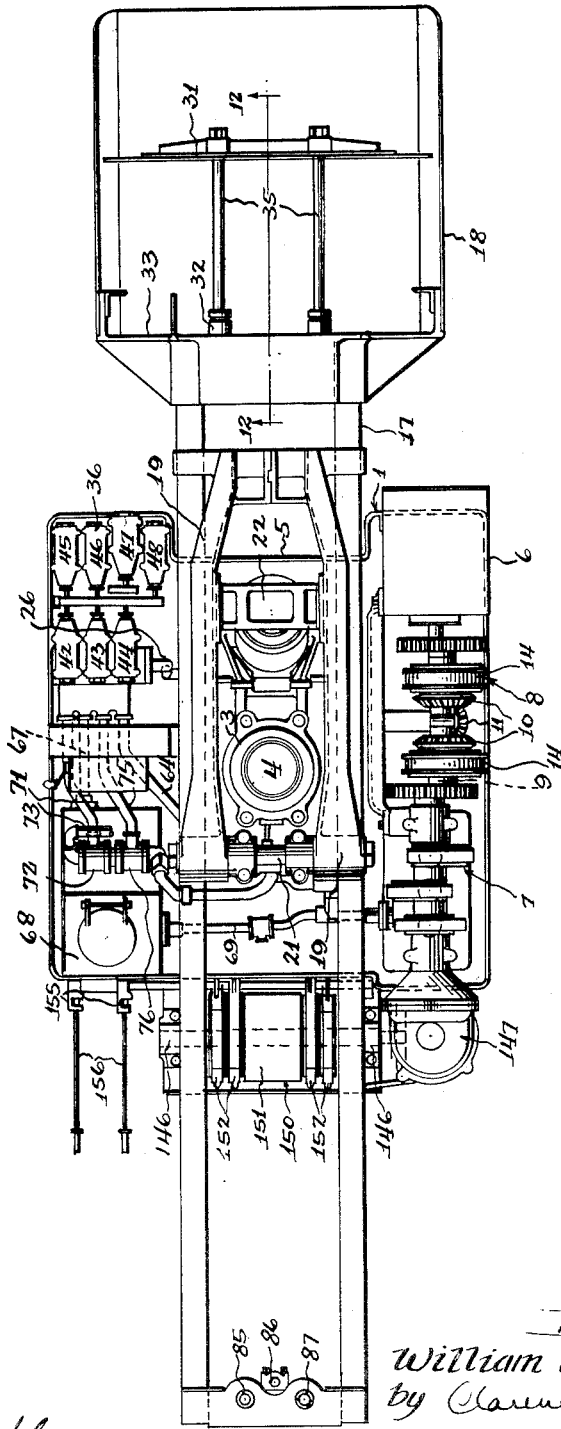

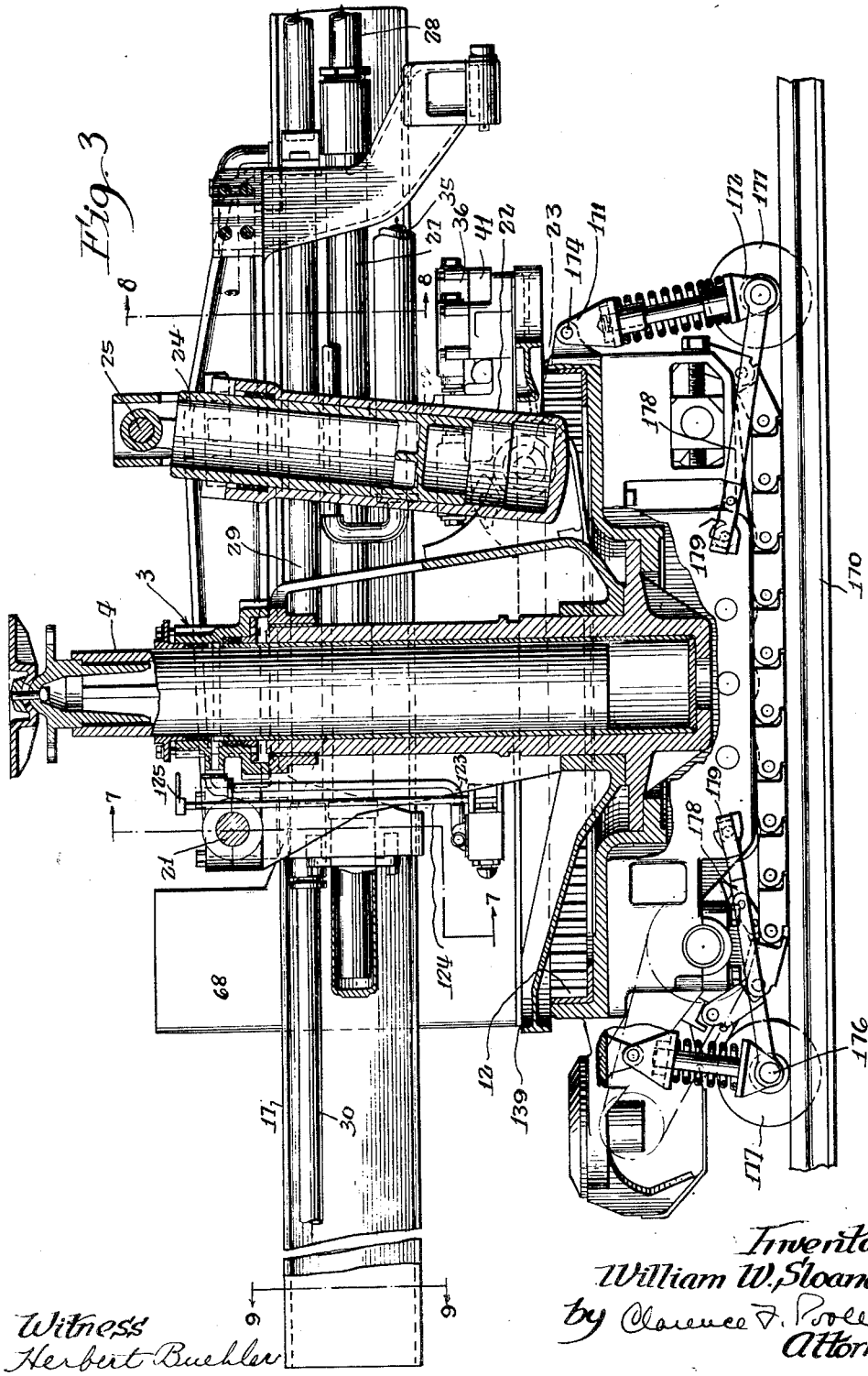

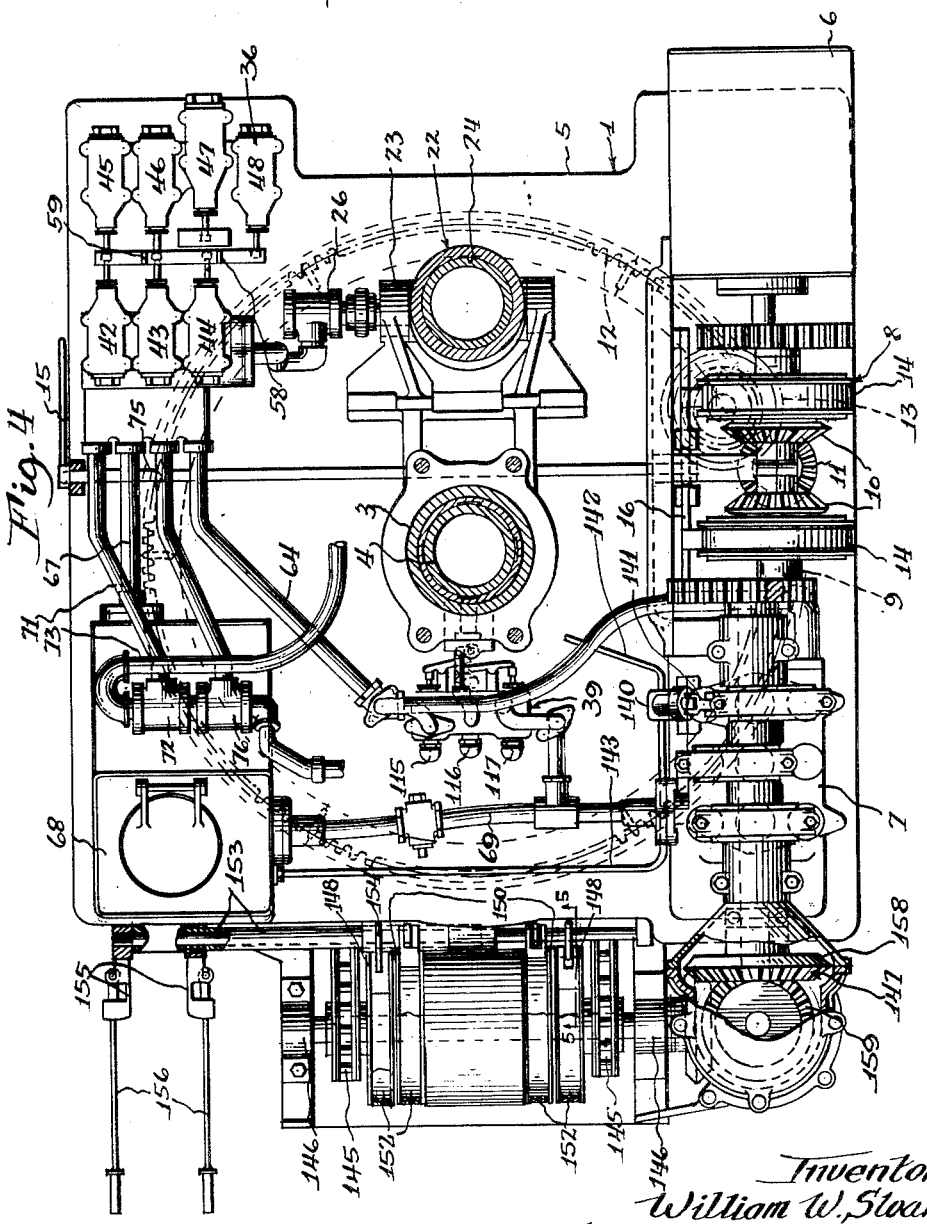

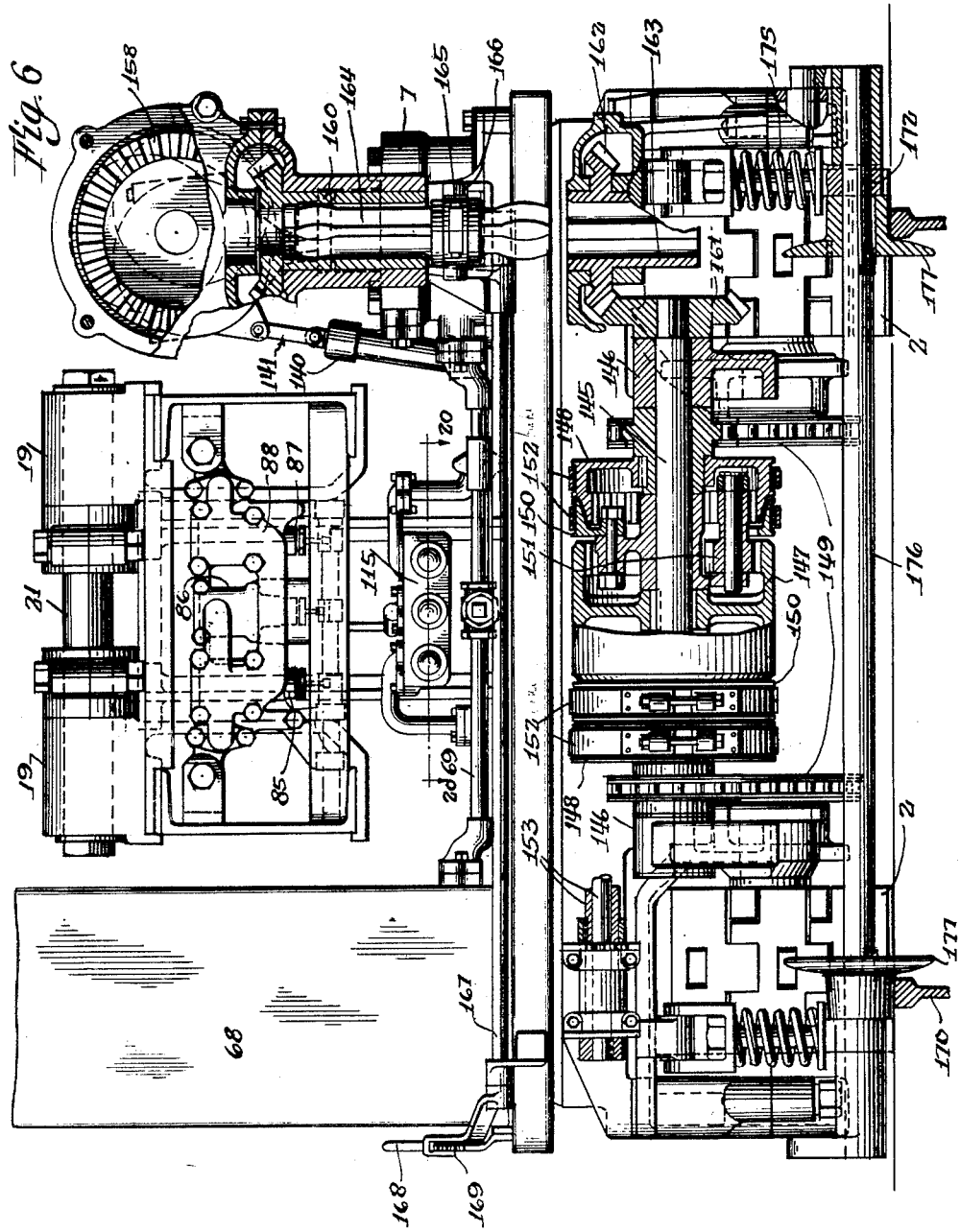

W. W. SLOANE

POWER SHOVEL

Filed Oct. 29, 1925

Inventor
William W. Sloane
by Clarence F. Poole
Attorney.

Witness
Herbert Buehler

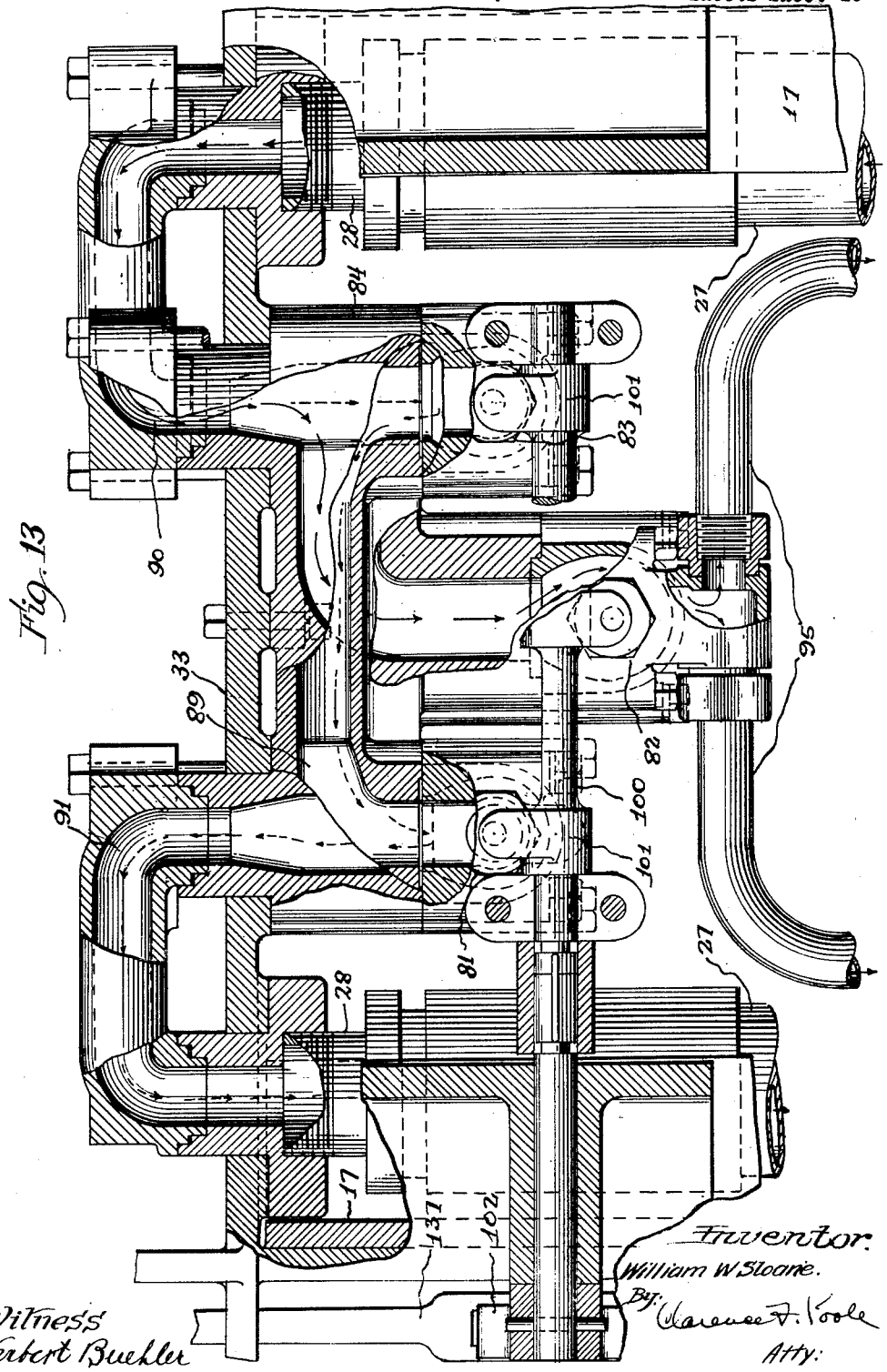

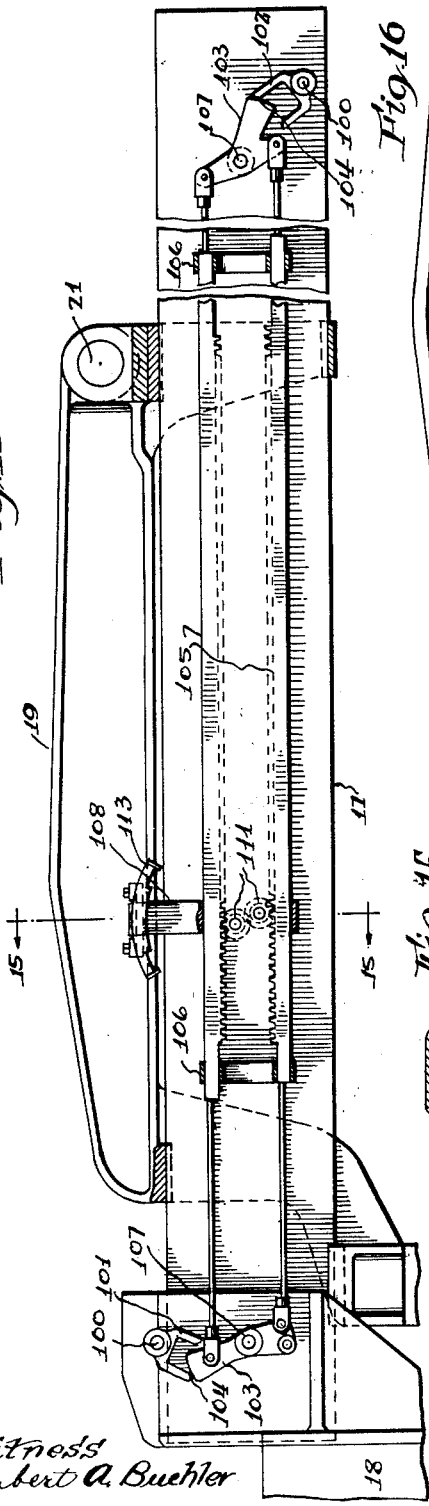
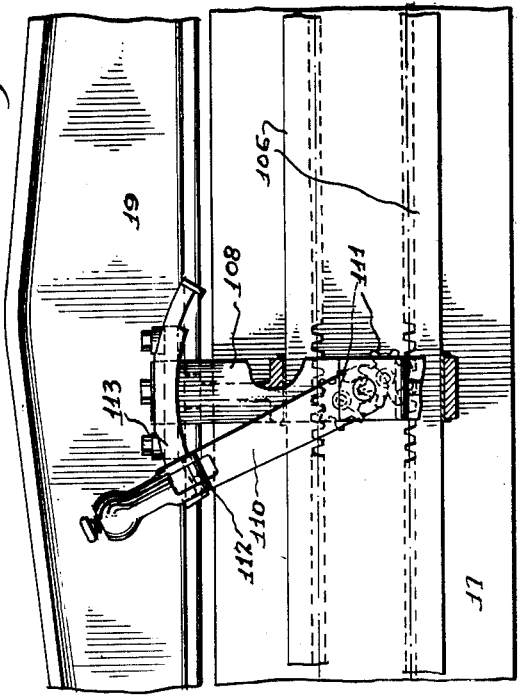
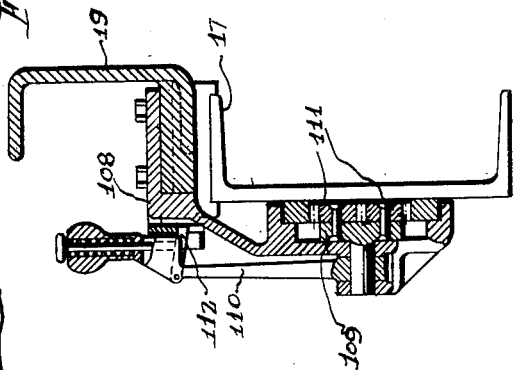

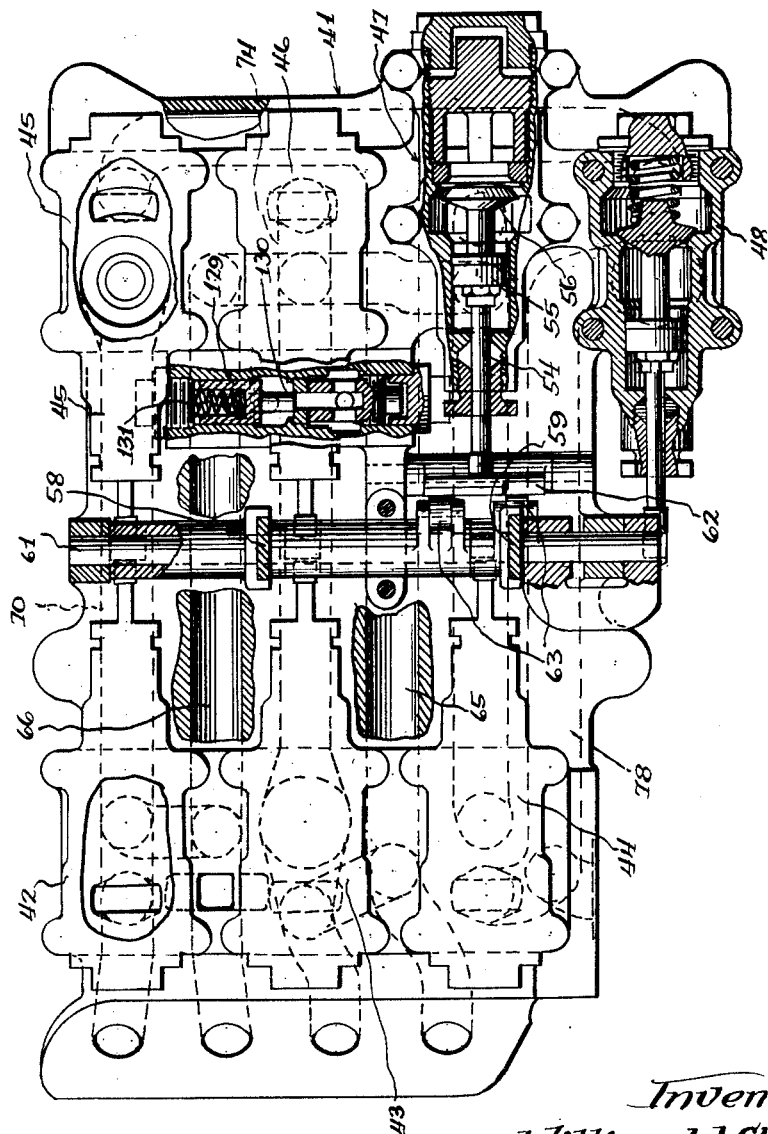

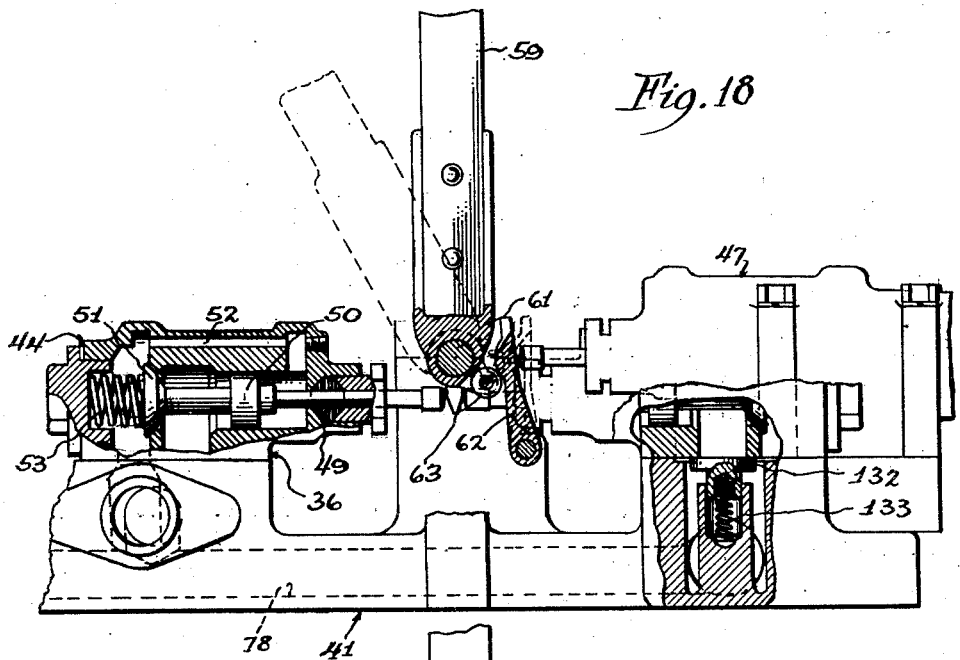
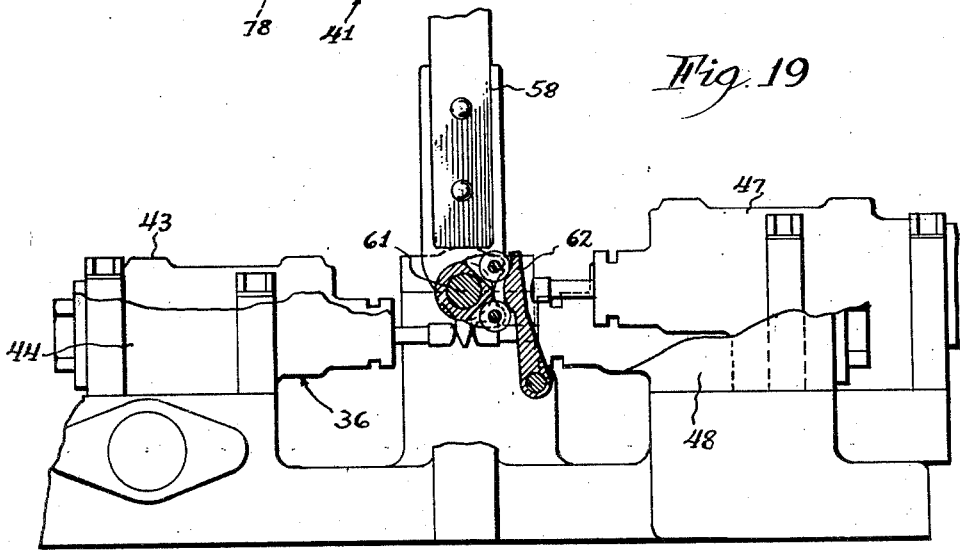

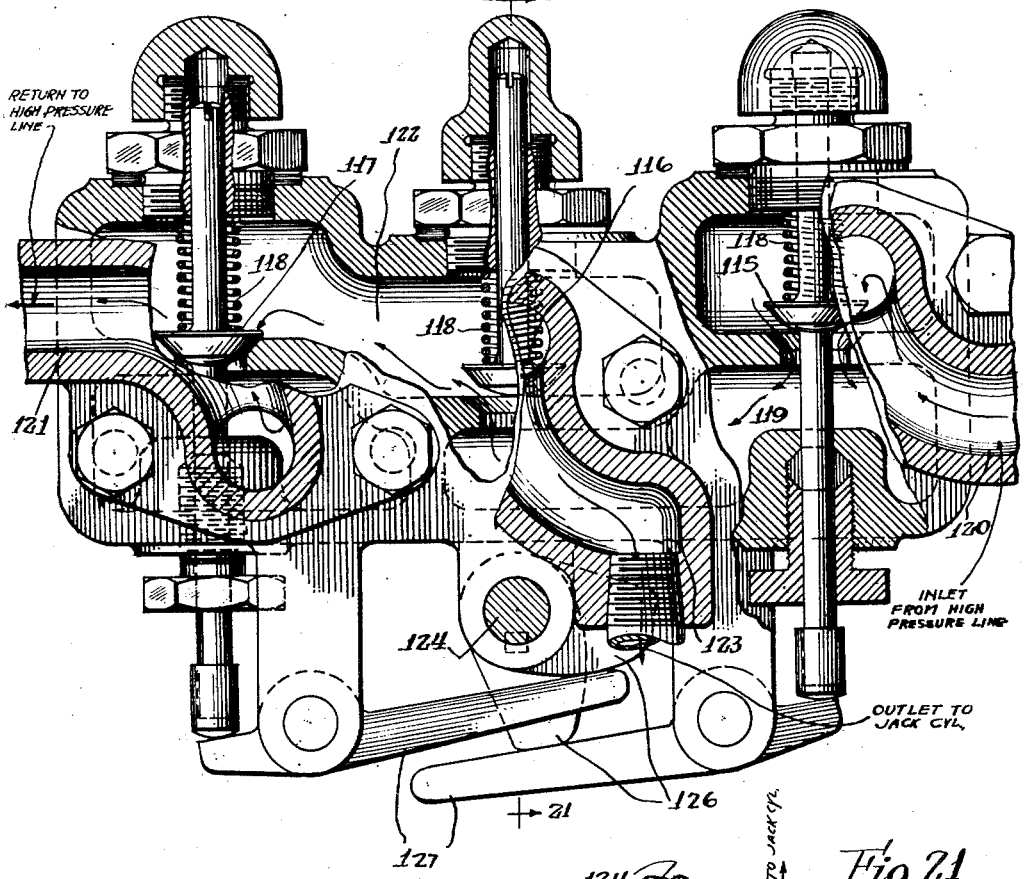
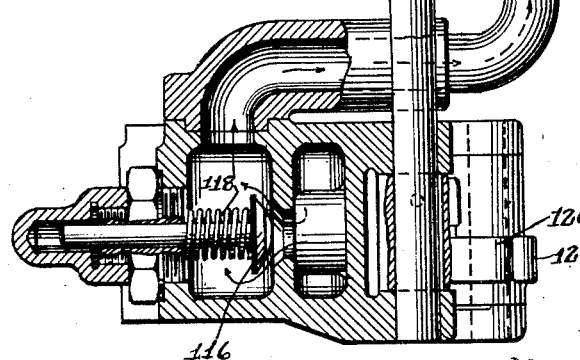

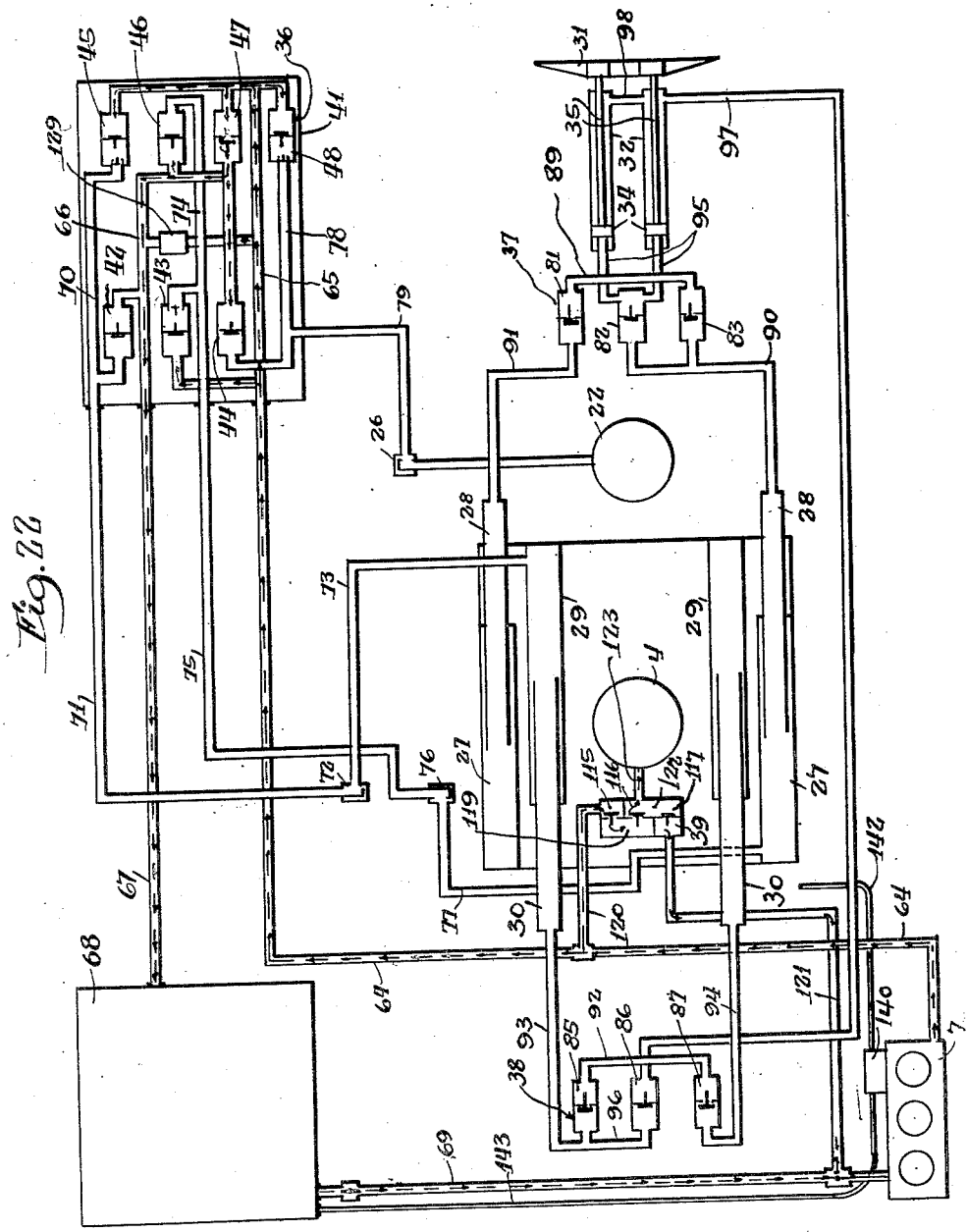

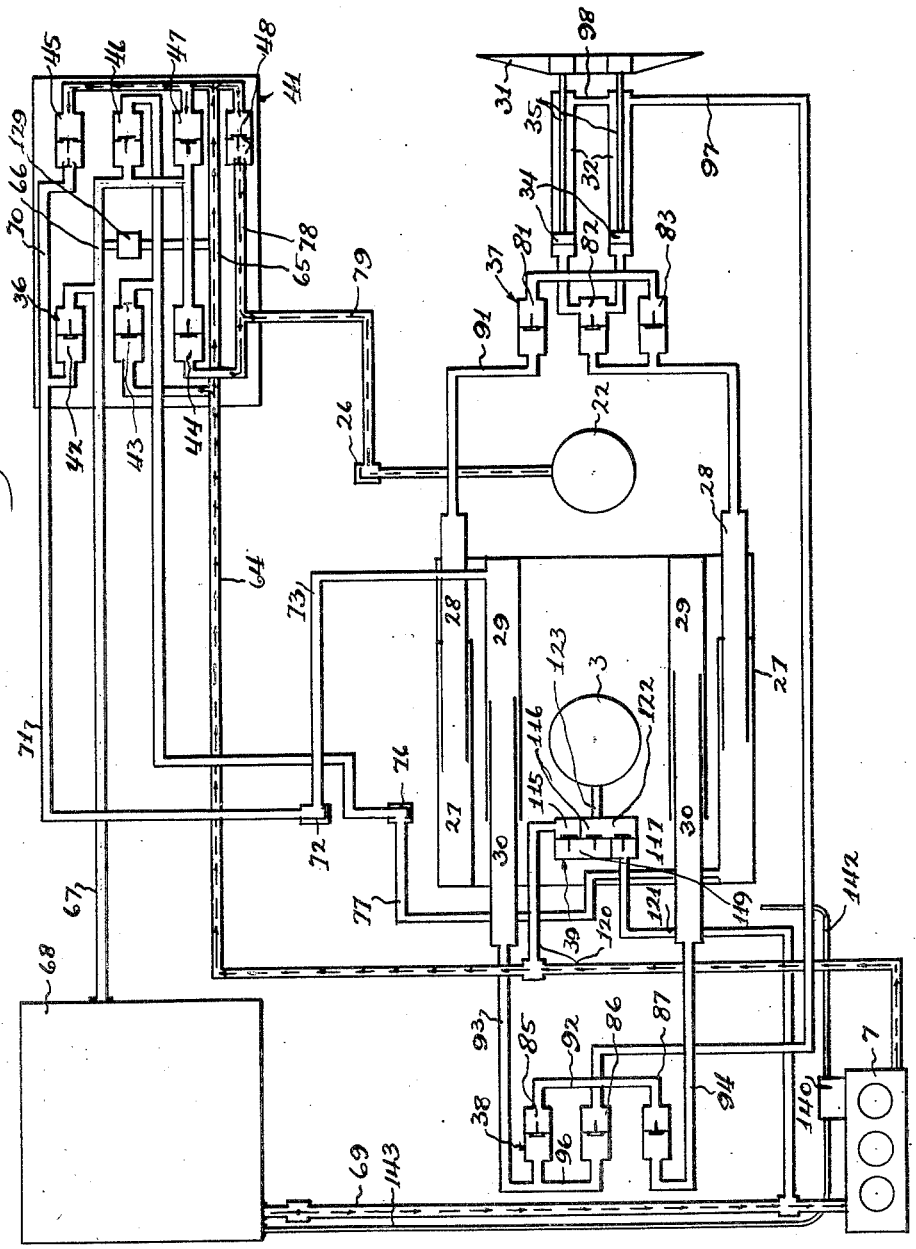

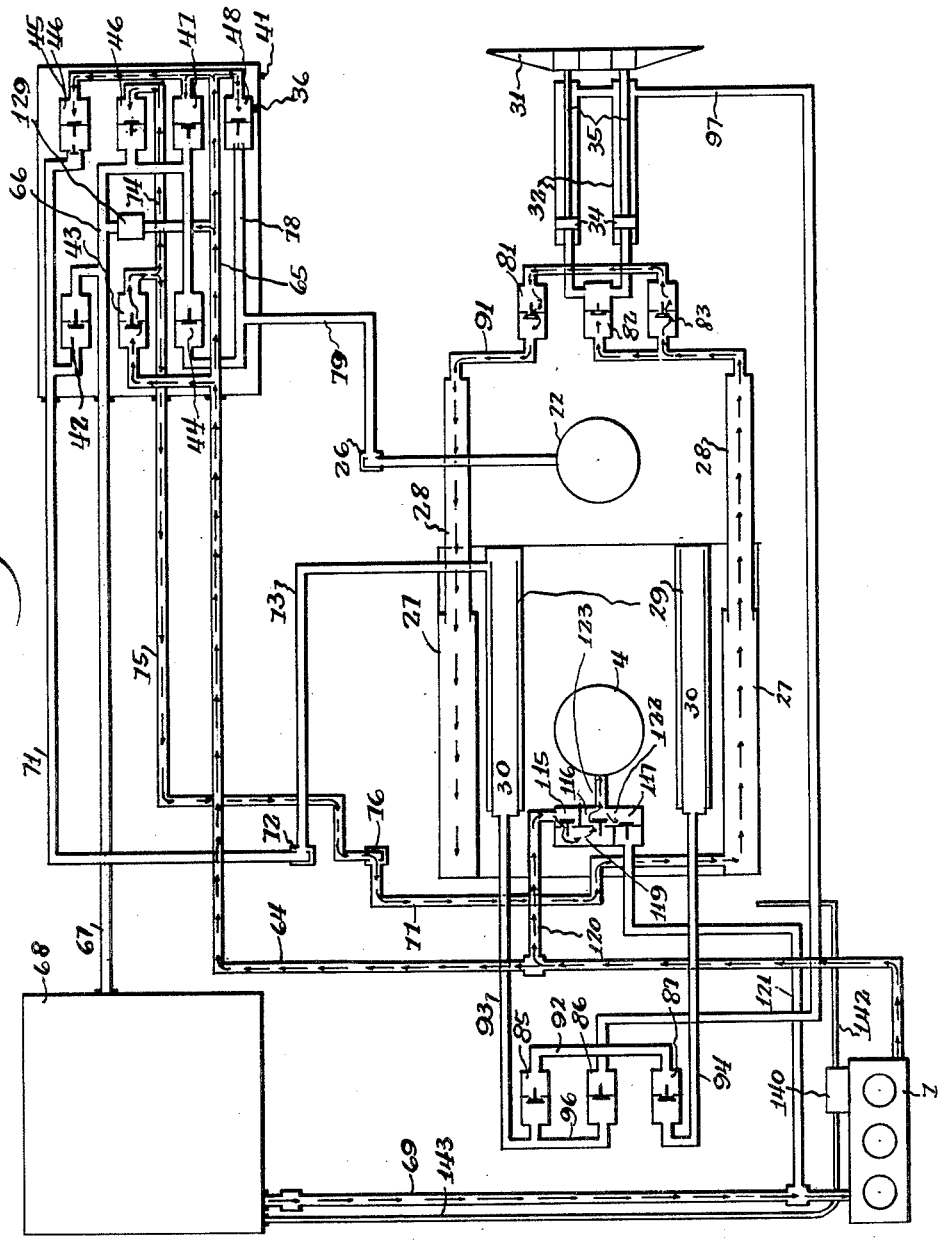

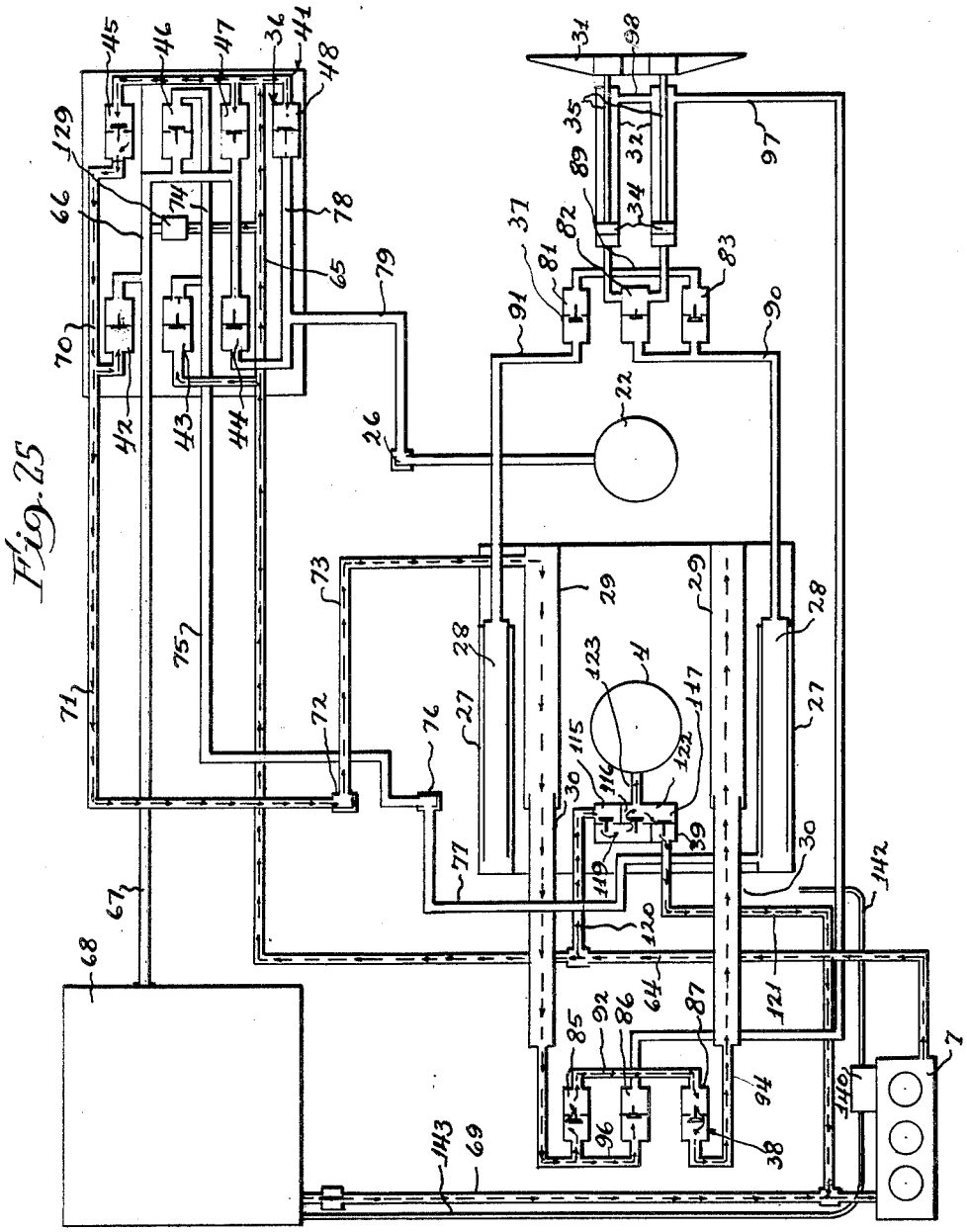

Dec. 27, 1927.  1,653,739
W. W. SLOANE
POWER SHOVEL
Filed Oct. 29, 1925    19 Sheets-Sheet 19

Fig. 26

Inventor
William W. Sloane
by Clarence F. Poole
Attorney

Witness
Herbert Buehler

Patented Dec. 27, 1927.

1,653,739

UNITED STATES PATENT OFFICE.

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS.

POWER SHOVEL.

Application filed October 29, 1925. Serial No. 65,549.

This invention relates to power shovels for use in confined spaces such as in mines although not limited to this use alone, the general objects thereof residing in the provision of a new and improved power shovel with a view toward high production, convenience and ease of manipulation and control, compactness, and general all around efficiency, particularly with relation toward use in confined spaces as aforesaid.

Referring to the drawings:

Figure 1 is a side elevation of a power shovel embodying one form of my invention;

Figure 2 is a plan view with parts omitted of the device illustrated in Figure 1;

Figure 3 is an enlarged vertical sectional view through the central part of the machine;

Figure 4 is a horizontal sectional view through the central part of the machine;

Figure 5 is an enlarged partial section on the line 5—5 of Figure 4;

Figure 6 is a rear elevation of the machine with parts broken away and in section and with parts omitted;

Figure 13 is a sectional view taken on the line 13—13 of Figure 12 with parts broken away;

Figure 14 is a longitudinally condensed side elevation of the beam, elevating arm, and related parts with portions thereof broken away;

Figure 15 is an enlarged section taken on the line 15—15 of Figure 14;

Figure 16 is an enlarged partial side view of the beam, elevating arm and certain related parts;

Figure 17 is an enlarged plan view of the platform valves with parts broken away;

Figure 18 is a side elevation of the platform valves with parts removed and in section;

Figure 19 is a similar side elevation of the platform valves with parts broken away at other points;

Figure 20 is an enlarged partial section taken on the line 20—20 of Figure 6;

Figure 21 is a section taken on the line 21—21 of Figure 20; and

Figures 22, 23, 24, 25 and 26 are diagrammatic views of the fluid pressure system showing various paths of the fluid during various positions of the control valves thereof.

Like numerals refer to like parts throughout the several figures.

Figure 7:
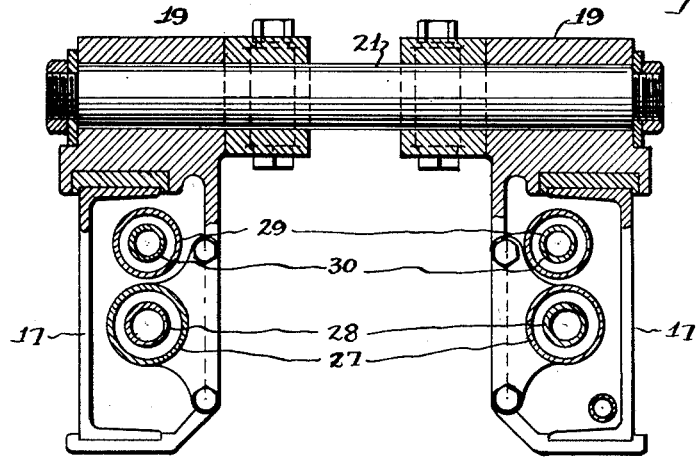
Figure 7 is an enlarged partial section on the line 7—7 of Figure 3.

Referring to the drawings 1 designates a base frame which is carried on laterally spaced continuous tread mechanisms 2 of usual construction which are adapted for the propulsion of the shovel.

Mounted centrally upon the base frame 1 is a vertically disposed cylinder 3 containing a piston 4, arranged so that the piston may be raised by fluid pressure to engage a fixed part, such as a roof, thus forming a holding jack for the machine while it is in operation.

A turntable or rotatable frame 5 is carried by the base 1 for movement axially about the vertically disposed cylinder 3, as best shown in Figure 3, and this turntable carries the major portion of the operating mechanism.

An electric motor 6 and a fluid pressure pump 7 are mounted on the turntable and are disposed in horizontal longitudinal arrangement along one side thereof. A reduction gear transmission mechanism 8, including a counter shaft 9, operably connects the adjacent ends of the shafts of the motor and pump. See Figures 1, 2 and 4. Carried for independent rotation on the counter shaft 9 is a pair of opposing bevel gears 10, and these gears oppositely mesh with a revoluble bevel gear 11 carried with the turntable 5, and this bevel gear is operably connected with a large internal gear 12, secured on the base 1 and disposed coaxially with the turntable, by means of a gear train 13, carried with the turntable for angularly moving the turntable on the base. See Figures 1, 3, and 4. Releasable frictional driving devices 14, of usual construction, are carried on the counter shaft 9 for operatively connecting respective bevel gears 10 with the counter shaft 9 to drive the turntable in either direction from the motor 6, said devices being manually controlled for normal release and for alternate engagement by means of a hand lever 15 on the opposite or control side of the turntable and operably connected with said devices by means of suitable mechanism 16.

Carried with the turntable is a beam 17 which carries a scoop 18 secured at the front end thereof. The beam comprises two longitudinal members disposed on opposite sides of the centrally disposed holding jack, and is mounted for longitudinal movement upon an elevating arm 19. See Figures 1, 2, 3 and 6. This elevating arm is journaled at its rear end on a shaft 21, carried by the turntable at an elevated point to the rear of the holding jack, for providing vertical movement of the scoop.

Actuating means for the elevating arm 19 consists of a cylinder 22 disposed forward of the holding jack and pivotally mounted on the turntable 5 by trunnions 23, see particularly Figure 3, and a piston 24 engaged in the cylinder and pivotally connected with the elevating arm as designated at 25. The cylinder 22 is connected with the hydraulic system, hereinafter described, through a swivel joint 26 in axial alignment with the trunnions 23.

Figure 8:
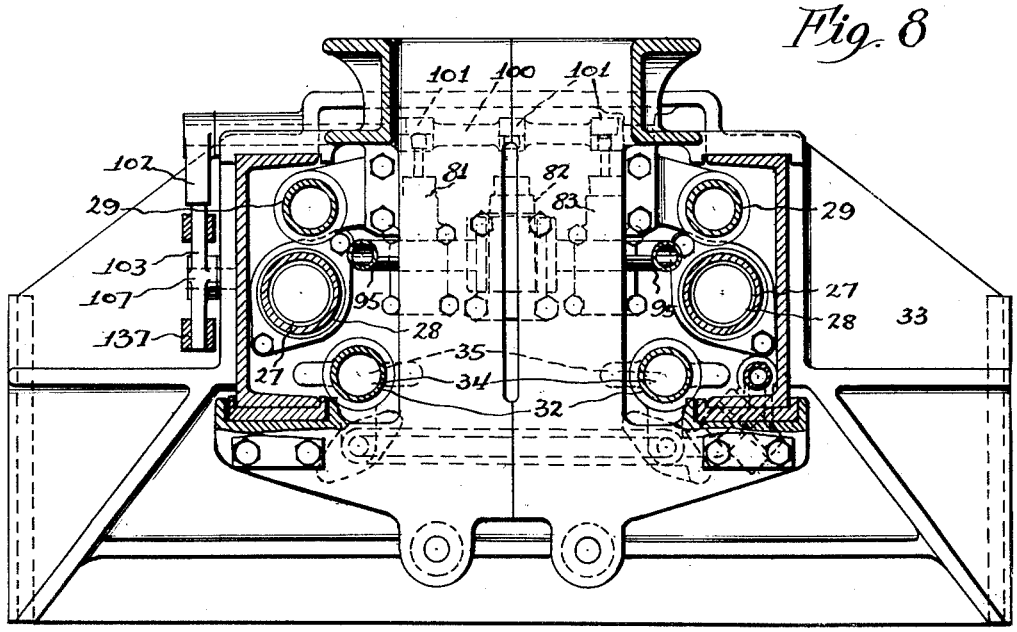
Figure 8 is an enlarged partial sectional view on the line 8—8 of Figure 3.
Figure 9:
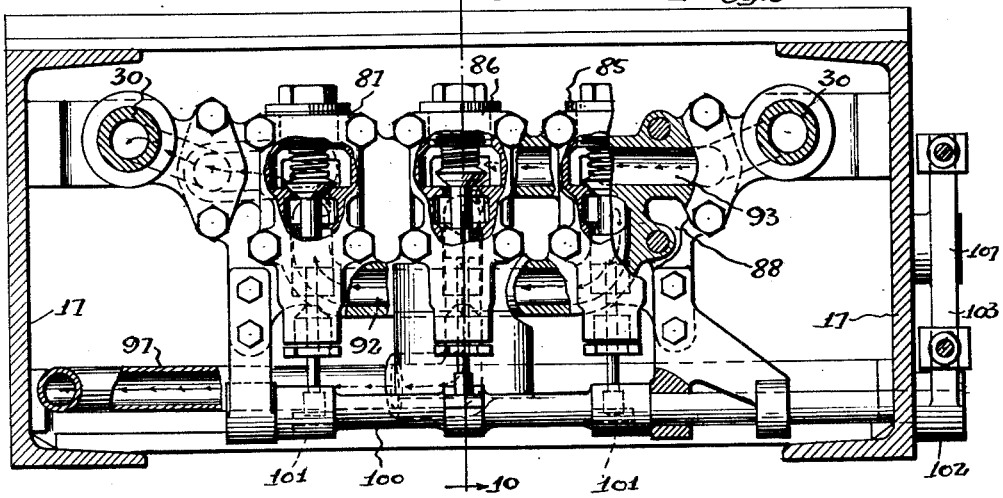
Figure 9 is an enlarged sectional view taken on the line 9—9 of Figure 3 with parts broken away.

Radial movement of the scoop 18 by longitudinal movement of the beam 17 is effected hydraulically and for this purpose there are provided two oppositely acting pairs of radial cylinders. The lower and larger pair of cylinders 27, hereinafter called the out cylinders, are secured with the elevating arm 19, as shown in Figure 7, and the plungers 28 thereof are secured with the forward end of the beam 17, as shown in Figure 13, to thrust the beam forwardly. The upper and smaller pair of cylinders 29, hereinafter called the in cylinders, are secured with the elevating arm 19, as shown in Figure 8, and the plungers 30 thereof are secured with the rear end of the beam 17, as shown in Figure 9, to thrust the beam rearwardly.

Figure 11:
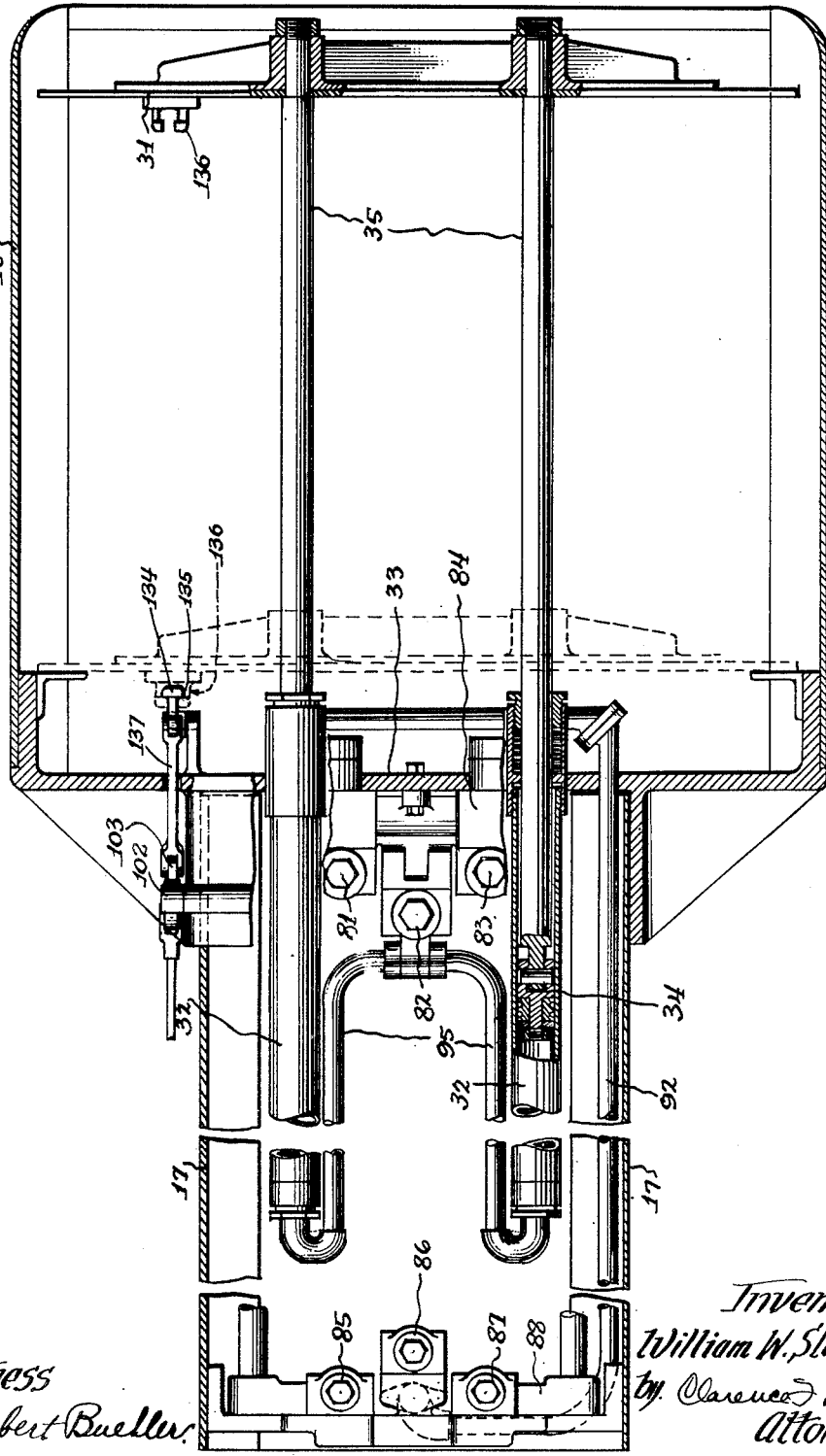
Figure 11 is an enlarged longitudinally condensed horizontal section of the beam and scoop structure with parts omitted.

The scoop 18 is provided with an ejector plate 31 movable longitudinally thereof for ejecting material from the scoop, and actuation of the ejector plate is effected hydraulically in the following manner. Two cylinders 32 are secured to a rear frame 33 of the scoop, this frame being secured to the front end of the beam 17, and the plungers 34 of these cylinders are connected through plunger rods 35 with the ejector plate 31 for moving the ejector plate longitudinally of the scoop outwardly to eject material from the scoop and for retracting the ejector plate to the inner end of the scoop, these cylinders being double acting. See Figures 11 and 12.

The hydraulic system for controlling the various movements of the hydraulically operated parts will now be described.

The pump 7, driven by the electric motor 6, serves to effect the pressure in the system. The connections from this pump to the various actuating parts of the system are effected through valve means, which as shown consist of platform valves generally indicated at 36, front and rear beam valves generally indicated at 37 and 38 respectively, and jack valves generally indicated at 39. The platform valves 36 are mounted on the turntable forwardly and on the side of the beam structure opposite that on which the pump 7 and motor 6 are disposed. See Figures 2 and 4. The front beam valves 37 are mounted on the beam 17 at the front end thereof and the rear beam valves 38 are mounted on the beam at the rear end thereof. See Figure 11. The jack valves 39 are mounted on the turntable at the rear side of the jack cylinder 3 and below the beam 17. See Figures 3 and 6.

The platform valves 36 are constructed as follows. See Figures 17, 18 and 19. A horizontally disposed manifold 41 is secured on the turntable as shown in Figure 3, and secured downwardly upon the upper face of this manifold are seven poppet valves 42, 43, 44, 45, 46, 47 and 48 respectively. These valves with the exception of valve 47 are similar in construction, each comprising a stem 49, and a piston 50, spaced longitudinally from the head 51 of the valve below the same, and having a by-pass 52 in the body of the valve communicating the upper side of the head with the lower side of the piston to balance the pressure on the upper side of the valve head, a spring 53 being provided to move the valve head into closed position with a relatively light unvarying pressure. The valve 47 comprises a stem 54, and a piston 55, spaced longitudinally from the head 56 of the valve above the same and having a by-pass, not shown but similar to the by-pass 52 of the other platform valves, in the body of the valve and communicating the lower side of the head with the upper side of the piston to partially balance the pressure on the lower side of the valve head.

These valves 42 to 48 inclusive are arranged in opposing banks horizontally with their stems extending toward opposite banks, and the valves 42 to 46 inclusive and 48 close in the direction of opposing banks while the valve 47 opens in the direction of the opposing bank. A pair of hand levers 58 and 59 are pivotally mounted on a shaft 61 disposed intermediate and extending longitudinally of said banks of valves. The lower end of the lever 58 is interposed between the stems 49 of the valves 42 and 43 in one bank and the stems of the valves 45 and 46 in the other bank whereby to open the valves 42 and 43 when moved in one direction and to open the valves 45 and 46 when moved in the other direction, these valves all being closed by the springs 53 thereof when this lever is in its intermediate position as shown in Figures 17 and 19. The lower end of the lever 59 is interposed between the stems of the valves 44 and 48 in opposite banks whereby to open the valve 44 when moved in one direction and to open the valve 48 when moved in the other direction, these valves both being closed by the springs 53 thereof when this lever is in its intermediate position as shown in Figures 17 and 18. The levers 58 and 59 extend upwardly from their axis for convenient manual manipulation. A rocker member 62 is pivoted on an axis parallel with and below the axis of the levers 58 and 59 and is engageable against the stem 54 of the valve 47 for closing the same. Two rollers 63 are mounted radially on the lever 58 adjacent the axis thereof and are spaced angularly to effect closing of the valve 47 with opposite movements of this lever. A roller 63 is mounted radially on the lever 59 adjacent the axis thereof to effect closing of the valve 47 with movement of this lever in the direction for opening the valve 48 as shown in dotted lines in Figure 18. Thus the valve 47 is closed with movement of the lever 58 in either direction or with movement of the lever 59 in the direction for opening the valve 48, and the arrangement is such that the valve 47 is closed upon further valve opening movements of either of the levers 58 and 59 after respective of the valves 42, 43, 45 and 46 and valve 48 have been opened for purposes hereinafter described.

Referring to Figures 22 and 26 inclusive, the fluid circulates from the pump 7 through a high pressure pipe 64 which connects with a passage 65 of the manifold 41 which in turn communicates with the valves 43, 45 and 48 above the heads thereof, so that these valves close with the pressure from the pump, and with the valve 47 below the head thereof so that this valve closes against the pressure from the pump. The valves 42 to 46 and 48 inclusive are normally closed and the valve 47 is normally open so that under idling conditions with the pump operating, see Figure 22, the fluid from the pump passes through the valve 47 into a passage 66 in the manifold 41 communicating with the valve 47 above the head thereof and from thence into a return pipe 67 leading from the passage 66 into a tank 68 mounted on the turntable 5 rearwardly on the same side of the turntable as the manifold 41 is disposed. See Figures 2 and 4. The pump 7 draws fluid from the tank through a pipe 69.

It will be observed that the valve 47 bypasses the fluid pressure from the pump 7 and it is accordingly hereinafter termed the by-pass valve, and the valves 43, 45 and 48 serve for selectively applying the pressure from the pump to the hydraulic actuating devices and are accordingly hereinafter termed pressure valves. The valves 42, 44 and 46 communicate below the heads thereof with the passage 66 and serve for selectively releasing fluid from the hydraulic devices and are accordingly hereinafter termed release valves.

A passage 70 in the manifold 41 communicates with the release valve 42 above the head thereof and with the pressure valve 45 below the head thereof, and a pipe 71 leads from this passage to a swivel joint 72. This swivel joint is disposed coaxially with the elevating arm 19 to provide for movement of the arm, and a pipe 73 carried with the elevating arm leads from this swivel joint to one of the radial in cylinders 29 whereby the valves 42 and 45 communicate therewith for supplying fluid pressure to the radial in cylinders and releasing fluid therefrom.

A passage 74 in the manifold 41 communicates with the pressure valve 43 below the head thereof and with the release valve 46 above the head thereof, and a pipe 75 leads from this passage to a swivel joint 76. This swivel joint is also disposed coaxially with the elevating arm 19 to provide for movement of the arm, and a pipe 77 carried with the elevating arm leads from this swivel joint to one of the radial out cylinders 27 whereby the valves 43 and 46 communicate therewith for supplying fluid pressure to the radial out cylinders and releasing fluid therefrom.

A passage 78 in the manifold 41 communicates with the release valve 44 above the head thereof and with the pressure valve 48 below the head thereof, and a pipe 79 leads from this passage to the aforementioned swivel joint 26 whereby the valves 44 and 48 communicate with the lifting cylinder 22 for supplying fluid pressure to this cylinder and for releasing fluid therefrom.

The front and rear beam valves 37 and 38 serve respectively to connect the radial out cylinders 27 in series and the radial in cylinders 29 in series or to seal the second radial in and out cylinders and communicate the first of the radial in and out cylinders with respective ends of the ejector cylinders 32 for locking the beam and actuating the ejector plate 31.

Figure 10:
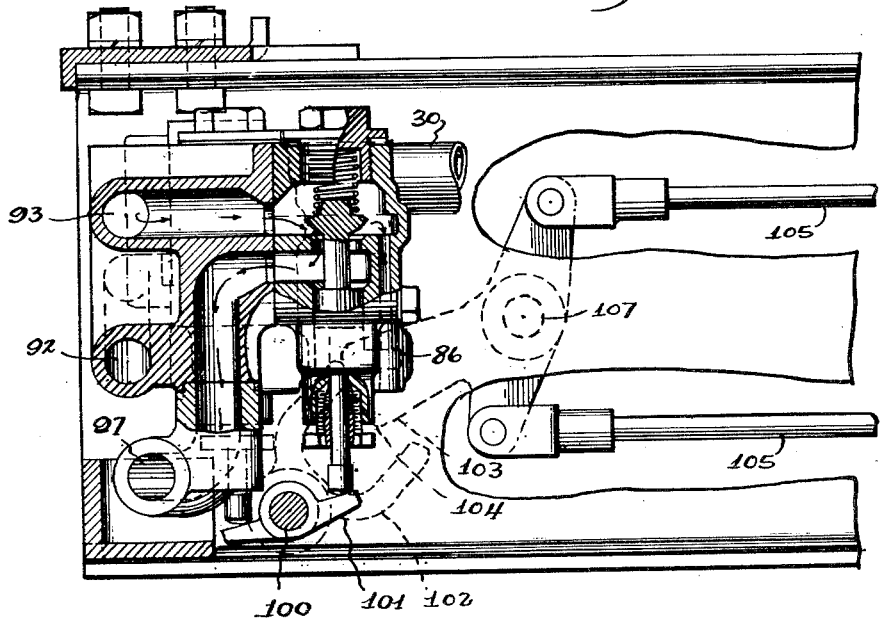
Figure 10 is a sectional view taken on the line 10—10 of Figure 9.

The front beam valves 37 comprise three valves 81, 82 and 83, which are mounted in vertical position on a manifold 84 disposed at the front end of the beam 17 and secured therewith. See Figures 12 and 13. The rear beam valves 38 comprise three valves 85, 86 and 87 which are mounted in vertical positions on a manifold 88 disposed at the rear end of the beam and secured therewith. See Figures 9 and 10. These valves are balanced poppet valves spring pressed into closed positions and being similar in construction to the valves 42 to 46 inclusive and 48 will not be described further.

The front beam valves 81 and 83 are connected in series in opposite arrangement to prevent check valve action by means of a passage 89 in the manifold 84 communicating with each of these valves under the heads thereof. See Figures 12 and 13. A passage 90 in the manifold 84 communicates with the valves 82 and 83 above the heads thereof and with the first of the radial out cylinders 27, that is the out cylinder to which the pipe 77 leads, through the hollow plunger 28 thereof. A passage 91 in the manifold 84 communicates with the valve 81 above the head thereof and with the second of the radial out cylinders 27 through the hollow plunger 28 thereof.

The rear beam valves 85 and 87 are connected in series oppositely arranged to prevent check valve action by means of a passage 92 in the manifold 88 communicating with each of these valves under the heads thereof. See Figures 9 and 10. A passage 93 in the manifold 88 communicates with the valves 85 and 86 above the heads thereof and with the first of the radial in cylinders 29, that is the in cylinder to which the pipe 73 leads, through the hollow plunger 30 thereof. A passage 94 in the manifold 88 communicates with the valve 87 above the head thereof and with the second of the radial in cylinders 29 through the hollow plunger 30 thereof.

A pair of pipes 95 communicate with the valve 82 under the head thereof and lead to the rear of respective ejector cylinders 32. See Figures 12 and 13. A passage 96 in the manifold 88 communicates with the valve 86 under the head thereof, see Figure 10, and a pipe 97 leads from this passage to the front end of one of the ejector cylinders 32, the front ends of the ejector cylinders being connected by a pipe 98.

When the valves 81, 83, 85 and 87 are open as shown in Figures 24 and 25, fluid pressure may be applied to either pair of beam operating cylinders and fluid released from the other for effecting longitudinal movement of the beam 17. When these valves are closed the beam is locked by reason of the sealing of the second of each pair of beam operating cylinders. The valves 82 and 86 are opened and closed in alternation with the valves 81, 83, 85 and 87, and when the valves 82 and 86 are opened the fluid pressure may be applied to either end of the ejector cylinders 32 to operate the ejector plate 31.

The mechanism for controlling the beam valves will now be described. A horizontal shaft 100, transverse to the beam 17, is carried for pivotal movement at each end of the beam, and each shaft has arms 101 secured thereon adapted for engagement with the stems of respective of the valves 81, 82, 83, 85, 86 and 87 for opening the same, the stems of the valves 82 and 86 being disposed on the sides of respective shafts opposite those on which the stems of the valves 81, 83, 85 and 87 lie whereby the valves 82 and 86 are opened in alternation with the valves 81, 83, 85 and 87 with opposite pivotal movements of these shafts. See Figures 9, 10, 12 and 13. Bifurcated levers 102 disposed on the side of the beam adjacent the control levers 58 and 59 are secured on respective shafts 100. Levers 103 are pivoted at said side of the beam adjacent the levers 102 on axes parallel with the shafts 100, and these levers 103 are provided with sector portions 104 engaging respective bifurcated levers for oppositely actuating and locking the same by engaging between the divided portions of respective levers 102 for actuating the same and endwise engaging said divided portions to lock the levers 102 at opposite ends of their movements. See Figures 10, 12 and 14. The valve 82 and the valves 81 and 83 are alternately opened at respective opposite locked positions of the respective bifurcated levers 102, and the valve 86 and the valves 85 and 87 are alternately opened at respective opposite locked positions of the respective bifurcated levers 102.

The levers 103 are controlled in the following manner. See Figures 14, 15 and 16. A pair of vertically spaced opposing racks 105 extend longitudinally of the beam at the vertical side thereof on which the levers 103 lie and are carried by the beam for independent longitudinal movement by means of suitable bearings 106. The racks are pivotally connected to said levers 103, as designated at 107, at diametrically opposite points for actuating these levers. Mounted on the elevating arm 19 intermediate the travel of the beam is a bracket 108 which overlies the racks. Pivotally mounted on the bracket 108 on a horizontal axis transverse to the beam is a member 109 to which is secured an upwardly extending hand lever 110. A pair of meshed revoluble spur gears 111 are mounted on the member 109 on axes parallel with and disposed on opposite sides of the axis of said member, and these gears mesh with respective racks 105. A manually releasable latch device 112 of usual construction is mounted on the lever 110 and engages notches in a sector 113 on the bracket 108 to maintain the lever at opposite ends of its movement.

It will be observed that the meshed gears 111 have a differential relation with the racks 105 so that during longitudinal movement of the beam 17 the racks move with the beam in unchanged relation, this relation being maintained by the gears 111. However, when the lever 110 is moved the gears 111 move with it and effect relative movement of the racks to actuate the levers 103 for actuation of the beam valves 37 and 38 as hereinbefore described. The arrangement is such that the valves 81, 83, 85 and 87 are open and the valves 82 and 86 are closed when the lever 110 is locked at one end of its movement, and that the valves 81, 83, 85 and 87 are closed and the valves 82 and 86 are open when this lever is locked at the other end of its movement. It will be observed that the mechanism above described is well adapted for the control of the beam valves from the turntable and that no sliding engagements of great length are involved therein.

The jack valves 39 comprise three valves 115, 116 and 117 incorporated in a manifold which serves as the body of these valves. See Figures 20 and 21. These are poppet valves and are yieldably urged into closed positions by springs 118. The valves 115 and 116 are connected in series in opposite arrangement to prevent check valve action by a passage 119 in their manifold and communicating with each of these valves under the heads thereof. A pipe 120 leads from the pressure pipe 64 to the valve 115 above the head thereof, and a pipe 121 leads from the valve 117 under the head thereof to the low pressure pipe 69. The valves 116 and 117 are connected above the heads thereof by a passage 122 in their manifold and a pipe 123 leads from this passage to the jack cylinder in a manner unnecessary to be described. The valves 115 and 117 are manually controlled in the following manner. A vertical shaft 124 extends upwardly from the jack valves 39 and has a handle 125 secured on the upper end thereof in a convenient position for manipulation. See Figures 3, 20, and 21. A pair of cams 126 are secured on this shaft 124 at its lower end, and a pair of rocker arms 127 are pivotally carried on the manifold of the jack valves for actuation by respective of the cams 126 and are adapted to engage the stems of respective of the valves 115 and 117 for opening the same. The cams 126 are arranged so that the valves 115 and 117 are alternately opened at opposite pivotal positions of the shaft 124.

In operation when the valve 115 is open fluid pressure from the pump 7 passes through this valve and opens the valve 116 which opens with the pressure, see Figures 20 and 22, and passes into the jack cylinder 3 to exert upward pressure on the piston 4. While the valve 115 is open the valve 116 serves as a check valve to prevent fluid from flowing from the jack cylinder back into the pressure line 64 when the pressure in the pressure line drops as by the opening of the valve 47, which it will be observed is normally open. Thus in order to operate the jack it is necessary to close the valve 47 with the valve 115 open. The fluid in the jack cylinder is released by opening the valve 117 as is obvious.

Referring now to Figures 22 to 26 inclusive, a brief description of the operation of the hydraulic devices will now be given.

The control of the jack has just been described, and the position of the jack valves 39 is shown in Figure 22 for exerting upward pressure on the piston 4. However, the valve 47 must have been closed for exerting this pressure, as is obvious. This view also shows the idle circulation of the fluid from the pressure line 64 through the valve 47 into the low pressure line 67.

Figure 23 shows the platform valves in the positions for exerting pressure in the lift cylinder 22 to lift the elevating arm 19. For effecting this condition the lever 59 is actuated to open the pressure valve 48 and then to close the by-pass valve 47. To release the fluid from the lift cylinder the lever 59 is operated to the reverse position in which the release valve 44 is open to release fluid from the lift cylinder and the valves 47 and 48 respectively opened and closed, the weight of the elevating arm and parts carried thereby serving to bring them to their lower positions when the valve 44 is opened.

Figure 24 shows the platform and beam valves in the positions for exerting pressure in the radial out cylinders 27 for effecting outward movement of the beam 17. For effecting this condition the valves 81, 83, 85 and 87 of the beam valves are opened by positioning the lever 110 to open same, and the lever 58 is actuated to open the valves 42 and 43 and then to close the valve 47. The open valves 81, 83, 85 and 87 connect the radial out cylinders in series and likewise the radial in cylinders 29 in series, and the opening of the valve 43 applies pressure to the out cylinders upon closure of the valve 47, and the opening of the valve 42 releases fluid from the in cylinders as the beam moves outwardly.

Figure 25 shows the platform and beam valves in the positions for exerting pressure in the radial in cylinders 29 for effecting inward movement of the beam. For effecting this condition the valves 81, 83, 85 and 87 of the beam valves are opened as before, and the lever 58 is actuated to open the valves 45 and 46 and then to close the valve 47. The opening of the valve 45 applies pressure to the in cylinders upon closure of the valve 47, and the opening of the valve 46 releases fluid from the out cylinders as the beam moves inwardly.

Figure 26 shows the platform and beam valves in the positions for exerting pressure in the rear ends of the ejector cylinders 32 for effecting ejecting movement of the ejector plate 31. For effecting this condition the valves 81, 83, 85 and 87 are closed and the valves 82 and 86 opened by properly positioning the lever 110, and the lever 58 is actuated to open valves 42 and 43 and then to close the valve 47. The closure of the valves 81, 83, 85 and 87 serves to seal the second radial in and out cylinders and thus lock the beam in position longitudinally. The opening of the valve 82 connects the rear end of the ejector cylinders 32 with the first radial out cylinder so that pressure applied to this cylinder by the valve 43 is transmitted to the rear ends of the ejector cylinders, and the opening of the valve 86 connects the front end of the ejector cylinders with the first of the radial in cylinders to release fluid from the front ends of the ejector cylinders by means of the open valve 42. Retracting movement of the ejector plate 31 is effected by actuating the lever 58 to open valves 45 and 46 and then to close the valve 47 as is obvious.

A safety valve 129 is connected across the passages 65 and 66 of the manifold 41 and operates to release excessive pressure developed by the pump 7, this valve consisting of a valve head 130 closing against the pressure in the passage 65 and normally held closed against said pressure by a spring 131. See Figure 17.

An automatic check valve 132 is provided between each of the pressure valves 43, 45 and 48 and the respective hydraulic actuating devices, and these check valves are arranged to open with the fluid pressure from the pump 7 and to close with pressure from the opposite direction to prevent pressure developed in the several hydraulic devices from passing into the passage 65 with the result that the hydraulic actuating devices controlled by the platform valves are locked in position when the levers 58 and 59 are in their normal positions. See Figures 22 to 26 inclusive. These valves are disposed in respective passages 70, 74 and 78 of the manifold 41 in vertical positions and are spring pressed by springs 133 upwardly against the lower surfaces of the bodies of respective of these valves to close the ports thereof communicating with respective of these passages. See Figure 18.

Figure 12:
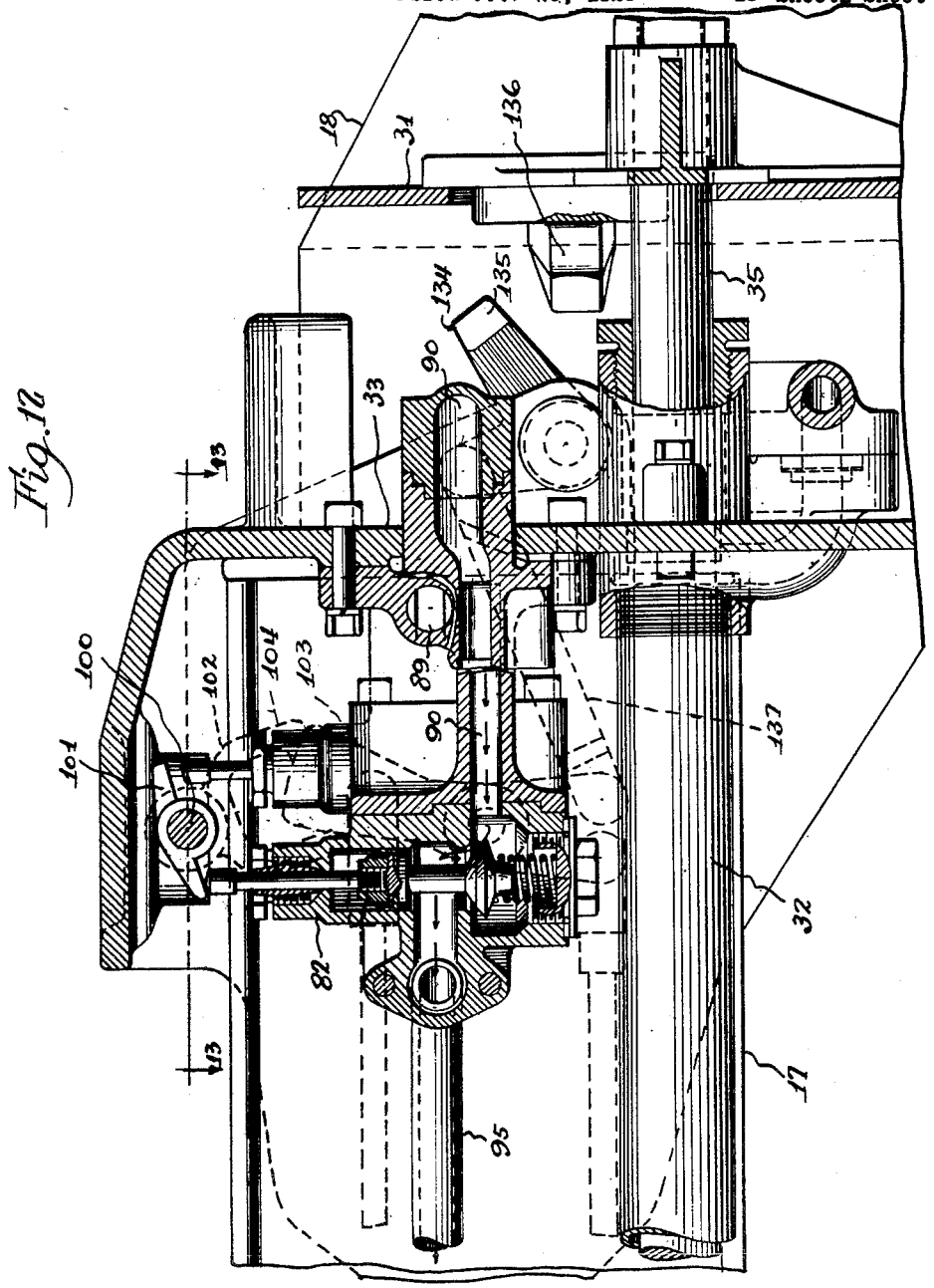
Figure 12 is an enlarged partial sectional view taken on the line 12—12 of Figure 2.

In order to lock the ejector plate 31 in its retracted position while the beam valves 37 and 38 are positioned for longitudinal movement of the beam 17 the following means is provided. See Figures 11 and 12. Mounted at the rear of the scoop 18 on a horizontal axis transverse to the beam 17 is a bell crank lever 134 on the outer extremity of one arm of which is a transverse lock formation 135 which is adapted to be moved in front of a complemental lock member 136, mounted on the ejector plate 31, when the ejector plate is in retracted position. See the dotted lines in Figure 11. Pivotal movement of the bell crank lever 134 serves to move the lock formation 135 thereof into and out of locking position in front of the lock member 136 when the scoop is in retracted position, and this pivotal movement of the bell crank lever is effected with the actuation of the beam valves 37 and 38 by a connecting link 137 pivotally connected at respective ends to the other arm of the bell crank lever and to the lever 103 at the front end of the beam, the arrangement being such that the lever 134 is positioned in locking position when the beam valves are positioned for longitudinal movement of the beam and out of locking position, as shown in Figure 12, when the beam valves are positioned for operating the ejector plate as hereinbefore described.

It will be observed that the lever 58 controls the longitudinal movement of the beam 17 or the actuation of the ejector plate 31 depending upon the position of the beam valves 37 and 38, and that the lever 59 controls the vertical position of the elevating arm 19 and the beam. The construction and arrangement of the platform valves and the control mechanism thereof provides a simple and effective selective control particularly with a view toward simplicity and ease of manipulation. Attention is directed to the fact that the by-pass valve 47 serves to by-pass the fluid pressure from the pump 7 except when it is closed as hereinabove described, and that in the preferred arrangement this valve automatically opens when manual manipulation or control of the levers 58 and 59 ceases. It will be further observed that the pressure valves 43, 45 and 48 are opened while the fluid pressure from the pump 7 is by-passed. When selection has been made by the closure of a pressure valve the by-pass valve is then closed to effect the selected actuation, the proper release valve having been opened for permitting the selected actuation. It will also be observed that the mechanical structure and arrangement of the platform valves and the control mechanism is quite simple and well adapted for its purpose.

It will be observed that the closed circuit fluid pressure actuating system, hereinabove described, is carried by the turntable 5 above the same. The turntable is adapted for collecting and holding leakage from the system, it being depressed toward the center thereof, as shown in Figure 3, and having an upwardly projecting continuous flange 139 extending around the sides thereof. A small pump 140 of usual construction is mounted on the inside of the pressure pump 7 and is connected for operation with the pressure pump in a usual manner as designated at 141. See Figures 4 and 6. An open ended pipe 142 leads from the intake side of the pump 140 to a low point in the receptacle formed by the turntable, as above described, for the drawing of fluid by the pump 140 from the receptacle, and a pipe 143 leads from the outlet side of the pump 140 to the tank 68. See Figure 22. Thus as the pumps 7 and 140 are operated the pump 140 returns the leakage on the turntable to the hydraulic system with obvious advantage.

Means is provided whereby the continuous tread mechanisms are driven in a controlled manner and will now be described. A horizontal transversely disposed transmission shaft 145 is journaled in spaced bearings 146 at respective sides of the frame 1 at the rear thereof. See Figures 4 and 6. A primary internal gear member 147 is secured on this shaft intermediate said bearings. Two final drive internal gear members 148 are journaled on the shaft 145 between said primary gear member 147 and respective of said bearings 146, and chain and sprocket drive devices 149 serve to drive said continuous tread mechanisms 2 from respective adjacent final drive gear members 148. Two intermediate members 150 are journaled on the shaft 145 between said primary gear member 147 and respective final drive members 148, and planetary gears 151 are carried by respective of said intermediate members and mesh with said primary gear member 147 and respective adjacent final drive members 148 for driving the same from said primary gear member. The final drive members 148 and the intermediate members 150 are provided with external friction brake surfaces and surrounding respective of these surfaces are brake bands 152 contractable on these surfaces for frictionally engaging the same.

Journaled on the rear end of the base frame 1 is a pair of horizontal transversely disposed telescoped shafts 153, and secured on each of these shafts is a pair of arms 154. See Figures 4 and 5. Each pair of these arms 154 is pivotally connected at diametrically opposite points to the ends of respective of a pair of said brake bands 152 respectively engageable with an intermediate member 150 and the associated final drive member 148. These arms are adapted for releasably contracting the brake bands 152 about respective of said brake surfaces by angular movement of respective of said shafts 153, and the arms of each of these pairs are angularly spaced for alternately engaging the respective brake bands with respective brake surfaces with opposite pivotal movements of the respective shaft 153. See Figure 5. Frictional engagement of the respective bands 152 with said intermediate members 150 effects a drive from the shaft 145 to respective continuous tread mechanisms in an obvious manner, and frictional engagement of the respective band 152 with said final drive members 148 effects retarding of respective continuous tread mechanisms in a likewise obvious manner.

It will be observed that each shaft 153 controls the brake bands 152 of a respective continuous tread mechanism for alternately driving or retarding the same, so that either or both continuous tread mechanisms may be driven from the shaft 145 or either mechanism driven and the other retarded for steering the shovel while it is propelled.

For purposes of manually controlling the shafts 153 a pair of radial arms 155 are secured on respective shafts 153, and a pair of hand levers 156 are detachably engaged with respective of said socket arms and project rearwardly from the frame 1 for actuation by an operator standing on the ground whereby the operator controls the propulsion and steering of the shovel while walking along with the shovel by manipulation of the levers 156. When the shovel is not being moved the levers 156 may be detached from the arms 155 so that they cause no interference.

The manner in which the shaft 145 is driven from the motor 6 will now be described. As hereinbefore described the motor 6 and pump 7 are disposed in horizontal longitudinal arrangement along one side of the turntable, and the turntable is operated angularly from the reduction gear transmission operably connecting the adjacent ends of the motor and pump shafts. See Figures 1, 4, and 6. Secured on the rear end of the shaft of the pump 7 is a bevel gear 158, and a bevel gear 159 is journalled on a vertical axis on an extension 160 at the rear end of the base of the pump 7 and meshes with the gear 158. Secured on the end of the shaft 145 corresponding with the side of the turntable on which the pump 7 is disposed is a bevel gear 161, and a bevel gear 162 is journaled on a vertical axis on an extension 163 of the base 1 and meshes with the gear 161. The gears 159 and 162 are disposed to align in the position of the turntable shown in the drawings. The gears 159 and 162 are provided with splined axial bores, and a splined positive clutch shaft 164 is engaged in the bore of the gear 159 for driving and for axial movement with respect thereto to engage the splined bore of the gear 162 for driving and to disengage therefrom, as shown in the drawings, to permit angular movement of the turntable on the base. A shifter collar 165 is mounted on the intermediate portion of the clutch shaft 164, and this shifter collar is engaged by a lever 166 secured on a transversely disposed pivoted shaft 167 carried on the turntable. A hand lever 168 is also secured on the shaft 167 for axially moving the clutch shaft 164 into and out of engaging position, and a usual latch device 169 is associated with this hand lever for releasably securing the clutch shaft 164 in the axial positions thereof. See Figure 6.

In order that the shovel may be conveniently moved along railway tracks with the continuous tread mechanisms 2 engaged on respective rails 170 of the track for propelling movement therealong the following guide means is provided.

Pairs of transversely spaced extensible arms are pivoted on the frame on aligned axes at respective ends of the frame. See Figures 1, 3 and 6. These arms comprise pivot parts 171 and outer parts 172 having rod portions slidably engaged in the pivot parts, and nuts 173 screw threaded on said rod portions to maintain the arms in assembly. The pivot parts 171 are pivotally mounted on the base by means of removable pivot pins 174, and coiled compression springs 175 encircle the rod portions of the parts 172 and abut both parts to yieldably extend the arms. Shafts 176 are journaled in transverse bores in the outer ends of respective transversely spaced pairs of these arms, and pairs of oppositely disposed flanged rollers 177 are secured in spaced relation on respective of these shafts. These rollers are disposed on the inside of respective of the pivot arms, and are adapted to engage downwardly on the rails 170 of the track with the flanges thereof at the insides of respective rails for guiding said continuous tread mechanisms engaged on the rails of the tracks for propelling movement therealong. Arms 178 are journaled at ends thereof on respective shafts 176 on the outside of the pivot arms and have the other ends thereof detachably secured to the frame 1 in a usual manner, as designated at 179, for securing the pivot arms in downwardly projecting positions with the flanged rollers 177 engaged with the rails of the track. The springs 175 compensate for variations in the track. The guiding means just described is easily removed from or assembled on the frame 1 by the removable pins 174 and the detachable devices 179.

The power shovel herein shown and described is similar in certain basis structure and arrangement to that described and claimed in my co-pending application for Letters Patent of the United States for improvements in power shovels, filed December 18, 1922, Serial Number 607,692.

Certain portions of the structure herein described are described and claimed in U. S. Letters Patent No. 1,612,542, granted December 28, 1926 on application filed by me for improvements in track guided vehicles; and in U. S. Letters Patent No. 1,640,055 granted August 23, 1927, on application filed by me for improvements in power shovels; and in my U. S. application for Letters Patent, Serial No. 105,630, filed April 30, 1926, for improvements in propulsion means for power shovels and the like; these Letters Patent and this application being divisions of the present application.

While I have herein shown and described one form of my invention, I do not wish to be limited to the precise details of construction or arrangements of parts herein shown and described except as specifically limited in the appended claims.

I claim as my invention:

1. In a power shovel, the combination of a supporting frame and a closed circuit fluid pressure actuating system carried thereby, said frame being adapted for receiving and holding leakage from said system, and means for returning said leakage from the frame to said system.

2. In a power shovel, the combination of a horizontally extending frame and a closed circuit fluid pressure actuating system carried by the frame above the same and including a fluid pressure pump, said frame being adapted for collecting and holding leakage from said system, and a second pump operated with said pressure pump for pumping fluid from the frame into said system.

3. In a power shovel, the combination of a turntable extending in a horizontal plane and a closed circuit fluid pressure actuating system carried by the turntable above the same and including a fluid pressure pump and a tank, said turntable being adapted for collecting and holding leakage from said system, and a second pump connected for operation with said pressure pump for pumping fluid on said turntable into said tank.

4. In a power shovel, the combination with a longitudinally movable beam and control means carried thereby, of an actuating member mounted independently of the beam, and differential mechanism adapted for response to adjustment of said actuating member for correspondingly adjusting said control means and compensating longitudinal movement of the beam.

5. In a power shovel, the combination with a longitudinally movable beam and control means carried thereby, of a manually actuated pivoted hand lever mounted independently of the beam, and differential mechanism operating longitudinally of said beam and adapted for response to actuation of said lever for correspondingly actuating said control means and compensating longitudinal movement of the beam.

6. In a power shovel, the combination with a longitudinally movable beam and control means carried thereby, of a pivoted member mounted independently of the beam on an axis transverse thereto, a pair of racks extending longitudinally of and carried with the beam for relative longitudinal movement for actuating said control means, and differential gear means carried by said pivoted member and meshed with said racks for longitudinal movement of the racks and the beam and for response to angular movement of said pivoted member for effecting relative longitudinal movement of the racks.

7. In a power shovel, the combination with a longitudinally movable beam and control means carried thereby, of a pivoted member mounted independently of the beam on a horizontal axis transverse thereto, a pair of vertically spaced opposing racks extending longitudinally of and carried with the beam on one vertical side thereof for independent longitudinal movement for actuating said control means, and a pair of meshed revoluble spur gears carried by said pivoted member for movement therewith and having their axes parallel with and disposed on opposite sides of the axis of said pivoted member and meshing with respective racks.

8. In a power shovel, the combination with a longitudinally movable beam and control means carried thereby, of a pivoted bifurcated member carried by the beam for actuating said control means, a second pivoted member carried by the beam and engaged with said bifurcated member for oppositely actuating and locking the same at opposite ends of its movement, an actuating member mounted independently of said beam, means for releasably maintaining said last mentioned actuating member at opposite ends of its movement, and differential mechanism adapted for response to adjustment of said last mentioned actuating member for correspondingly adjusting said second pivoted member and compensating longitudinal movement of the beam.

9. In a power shovel, the combination with a longitudinally movable beam and control means carried thereby, of a pivoted bifurcated member carried by the beam on an axis transverse thereto for actuating said control means, a second pivoted member carried by the beam on a second similarly extending axis and engaged with said bifurcated member for oppositely actuating the same and locking the same at opposite ends of its movement, a pivoted hand lever mounted independently of the beam, releasable latch means for locking said hand lever at opposite ends of its movement, and differential mechanism operating longitudinally of the beam and connected with said second pivoted member and said hand lever for response to actuation of said hand lever for correspondingly actuating said second pivoted member and compensating longitudinal movement of the beam.

10. In a power shovel, the combination with a longitudinally movable beam and control means carried thereby, of a pivoted bifurcated member carried by the beam on an axis transverse thereto, a second pivoted member carried by the beam on a similarly extending axis and engaged with said bifurcated member for oppositely actuating and locking the same at opposite ends of the movement thereof, a third pivoted member mounted independently of said beam on an axis extending similarly with the aforementioned axes, means for releasably maintaining said third pivoted member at opposite ends of its movement, a pair of spaced opposing racks extending longitudinally of and carried with the beam for independent longitudinal movement and pivotally connected with said second pivoted member at diametrically opposite points, and a pair of meshed revoluble spur gears carried by said third pivoted member for angular movement therewith and having their axes disposed on opposite sides of the axis of said third pivoted member and meshing with respective racks.

11. In a power shovel, the combination with a longitudinally movable beam and control devices carried thereby at opposite ends thereof, of a pivoted member mounted independently of said beam at an intermediate point in the travel of the beam, and differential mechanism including means extending longitudinally of the beam between said control devices and carried with the beam for movement longitudinally thereof to actuate said control devices and adapted for response to angular movement of said pivoted member for correspondingly actuating said control devices and compensating longitudinal movement of the beam.

12. In a power shovel, the combination with a longitudinally movable beam and control devices carried thereby at opposite ends thereof, of two pivoted bifurcated members carried by the beam adjacent respective ends thereof on parallel horizontal axes transverse to the beam, two additional pivoted members carried by the beam adjacent respective bifurcated members on axes parallel to the axes thereof and engaged with respective bifurcated members for oppositely actuating and locking the same at opposite ends of the movement thereof, a pivoted hand lever mounted independently of the beam intermediate the travel of the beam on horizontal axis transverse to the beam, manually releasable latch means on the hand lever for locking the same at opposite ends of the movement thereof, a pair of vertically spaced opposing racks extending longitudinally of and carried by the beam on one vertical side thereof for independent longitudinal movement and pivotally connected to said second mentioned pivoted members at diametrically opposite points, and a pair of meshed revoluble spur gears carried with said hand lever for angular movement therewith and having their axes parallel with and disposed on opposite sides of the axis of said hand lever and meshing with respective racks.

Signed at Chicago, in the county of Cook and State of Illinois, this 27th day of October, A. D. 1925.

WILLIAM W. SLOANE.